United States Patent [19]
Yamano et al.

[11] Patent Number: 5,195,273
[45] Date of Patent: Mar. 23, 1993

[54] STRUCTURE OF WINDOW RUN-INTEGRATED GUIDE APPLICABLE TO AN AUTOMOTIVE VEHICLE

[75] Inventors: Katsumi Yamano; Toshiaki Yamaguchi, both of Chiba, Japan

[73] Assignee: Kinugawa Rubber Industrial Co., Ltd., Chiba, Japan

[21] Appl. No.: 751,145

[22] Filed: Aug. 28, 1991

[30] Foreign Application Priority Data

Aug. 31, 1990 [JP] Japan .................... 2-231208

[51] Int. Cl.⁵ .................... E05D 15/16; E06B 7/16
[52] U.S. Cl. .................... 49/441; 49/490
[58] Field of Search ............ 49/441, 440, 490, 502

[56] References Cited

U.S. PATENT DOCUMENTS 4,409,756 10/1983 Audenino et al. .................... 49/440
4,457,111 7/1984 Koike .................... 49/441

FOREIGN PATENT DOCUMENTS 3106909 3/1982 Fed. Rep. of Germany .
633771 6/1983 Japan .
6347645 9/1983 Japan ..

Primary Examiner—Philip C. Kannan
Attorney, Agent, or Firm—Bachman & LaPointe

[57] ABSTRACT

A structure and process for forming a window guide integrally formed with a window run applicable to an automotive vehicle in which the window guide is formed by means of injection molding with a molten resin. The window guide has an extended portion of a substantially U-shaped cross section, the extended portion may be made uniform in thickness without sinks and/or weld marks by provision of a thickness reducing portion during moulding. An end edge of the extended portion extends toward the outside of the vehicular body.

5 Claims, 3 Drawing Sheets

PRIOR ART

PRIOR ART

STRUCTURE OF WINDOW RUN-INTEGRATED GUIDE APPLICABLE TO AN AUTOMOTIVE VEHICLE

BACKGROUND OF THE INVENTION (1) Field of the Invention

The present invention relates generally to a window guide applicable to a door window of an automotive vehicle which is movable in up and down directions.

Particularly, the present invention relates to a guide formed integrally with the window run formed in a door sash.

(2) Description of the Background Art

A structure of a conventional door portion of a vehicular body includes a resin-made window guide 2 located on a door sash 1 as shown in FIG. 1. In the way described above, lifting and lowering of a door window 3 may be smoothly carried out.

The window guide 2 is, as shown in FIGS. 2 and 3, formed with a part of the window run 4 mounted on a door sash (not shown). A part of the window run 4 is formed with a cut out 7 extending through a window run substrate or base 5. Injection moulding causes a part of the cut out 7 to be filled with a resin material by means of the injection molding so that the window run 4 is integrally formed. A glass guide 2 is thereby formed so that the end edges in an upper portion of the door pillar extend more than the other portions of the window run. When the end of the window 3 is contacted with the extended portion A when it is raised, the edge of the window can be smoothly guided to the inner portion of the window run 4.

It is noted that numerals 8 and 8' denote seal lips for the window.

A Japanese Patent Application First Publication No. Showa 63-3771 and Japanese Patent Application Second Publication No. Showa 63-47645 exemplify structures similar to the window guide described above.

To form the glass guide 2, a part of the window run 4 which is provided with the cut-out 7 is set in forming dies constituted by a lower die 9, an upper die 10, and small middle dies 11, 12, and 13, as appreciated from FIG. 4. A molten resin is injected into a cavity 15 through a gate 14 mounted on the upper die 10. In the case of the window guide 2 described above, a sink is formed on the extended part A since the extended part A has a greater thickness as compared with the other parts. Further, a weld mark or such like may be caused by the introduction of air due to a swirl stream forming within the cavity 15 during the injection of the molten resin and may appear on an outer surface of the window guide 2.

SUMMARY OF THE INVENTION

It is, therefore, an object of the present invention to provide a structure of a window run integrated window guide having a high-finish outer appearance such that no sink, weld marks or jetting appear on the outer surface of an extended portion of a window guide.

The above-described object can be achieved by providing a structure of a window guide integrally formed with a window run applicable to an automotive vehicle, comprising: a) a window run mounted on a door sash having a notch provided at a part of a side wall thereof outside of a vehicular body; and b) a window guide integrally formed with the notch and having an extended portion from an integrally linked portion of the window run, the extended portion having a substantially oblique U-shaped cross section with a groove therein.

The above-described object can also be achieved by providing a structure of a window guide integrally formed with a window run mounted on a part of a vehicular body, comprising: a) a notch formed on an end of an inverse T shaped window run so as to direct toward an outside of the vehicular body; and b) a window guide member extended from the notch toward the outside of the vehicular body and formed by injection molding, the window guide member having an extended portion being formed with a thickness eliminating portion so as to provide a uniform thickness along the extended portion.

The above-described object can also be achieved by providing a process of forming a window guide integrally formed with a window run of a vehicular body, comprising the steps of: a) preparing a plurality of forming dies having a lower die, a top die, and middle small dies and a gate located on the top die, one of the middle small dies being formed with an elongate projection so as to provide an uniform passage cross section along the gate; and b) injecting a molten resin through the gate so as to form the window guide, the window guide being extended from a notch of the window run and along the uniform passage cross section so that an extended portion of the window guide having the uniform thickness along the elongate projection of the one of the middle small dies is formed without sink and weld mark.

DESCRIPTION OF THE PREFERRED EMBODIMENTS

Reference will hereinafter be made to the drawings in order to facilitate a better understanding of the present invention.

FIGS. 1 through 4 have already been explained in the BACKGROUND OF THE INVENTION.

Figure 1:
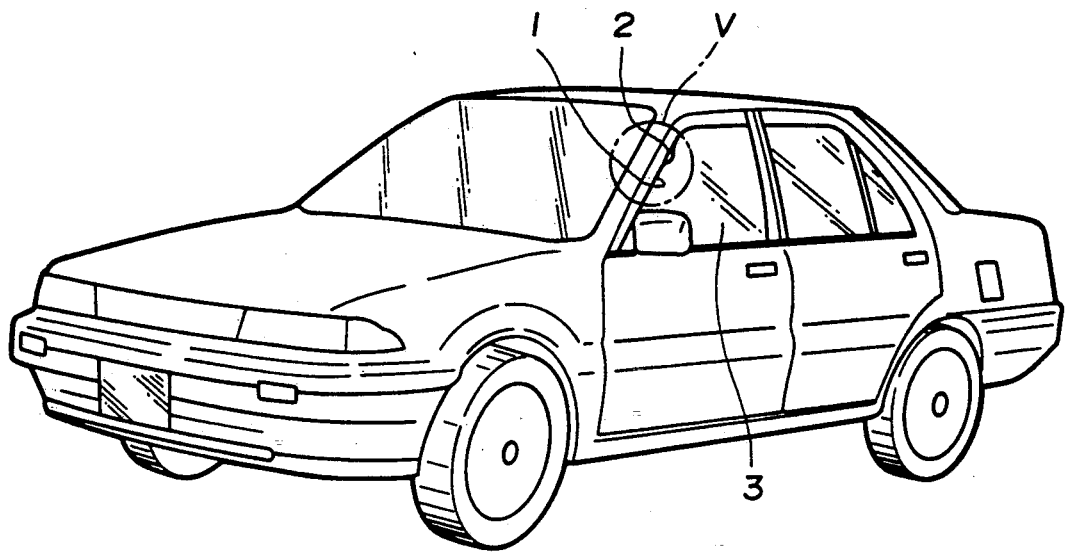
FIG. 1 is a perspective view of a vehicular body on a part of which a window guide is mounted.
Figure 2:
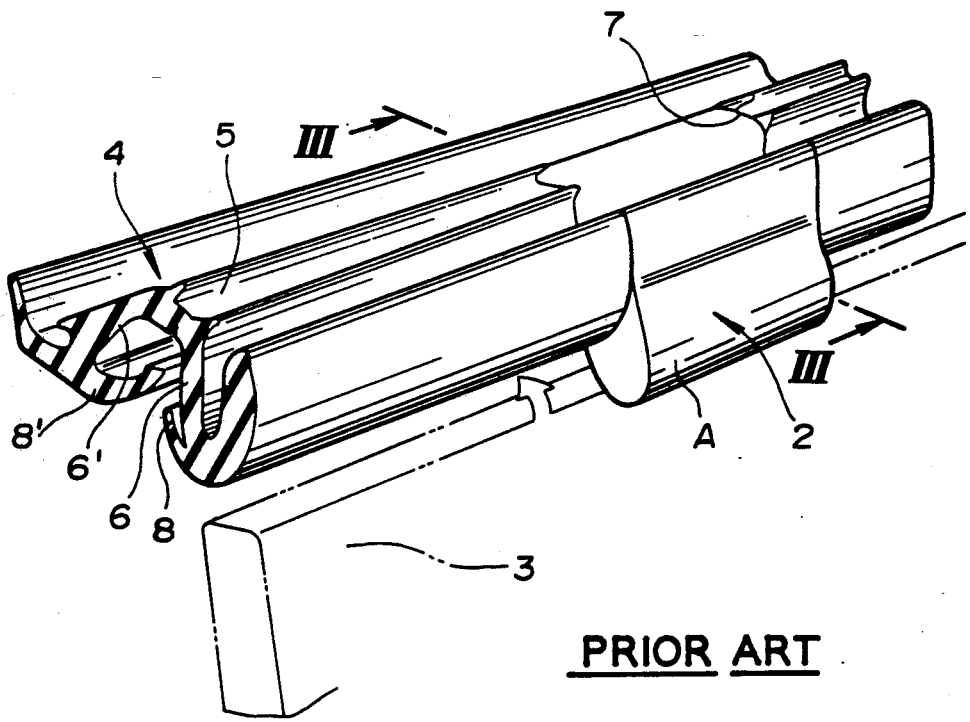
FIG. 2 is a perspective view of a previously proposed window guide.
Figure 3:
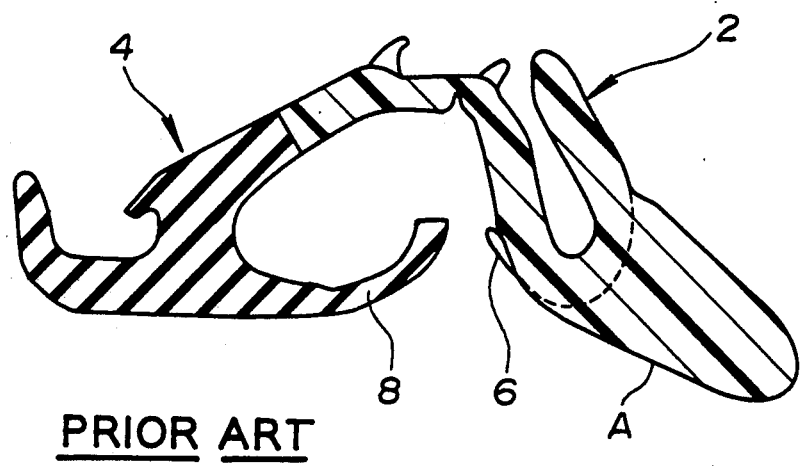
FIG. 3 is a cross sectional view cut away along line III—III of FIG. 2.
Figure 4:
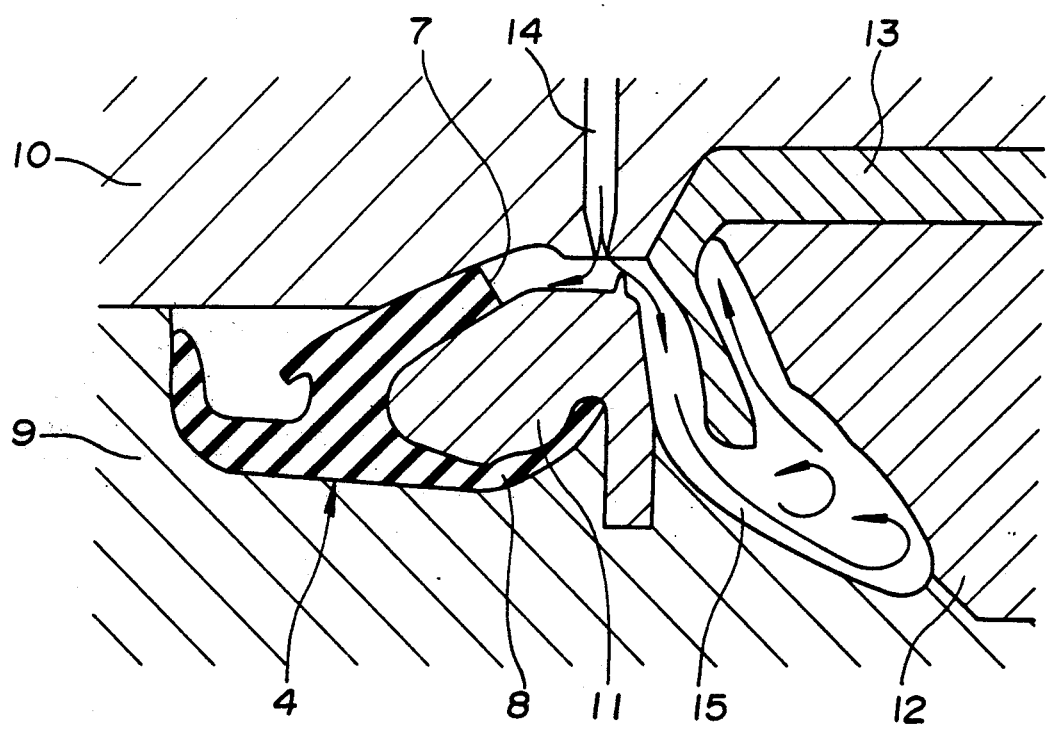
FIG. 4 is a cross sectional view of the previously proposed window guide.
Figure 5:
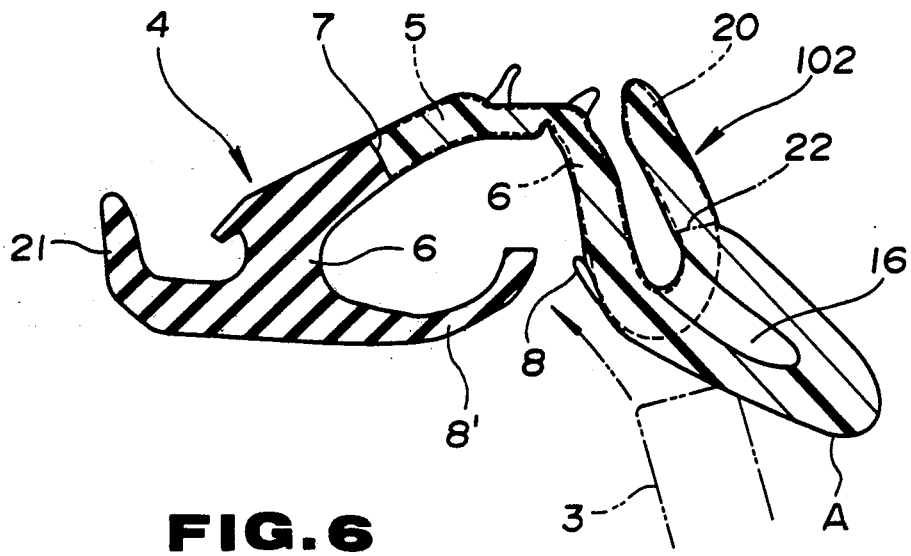
FIG. 5 is a cross sectional view of a window guide of a first preferred embodiment according to the present invention.
Figure 6:
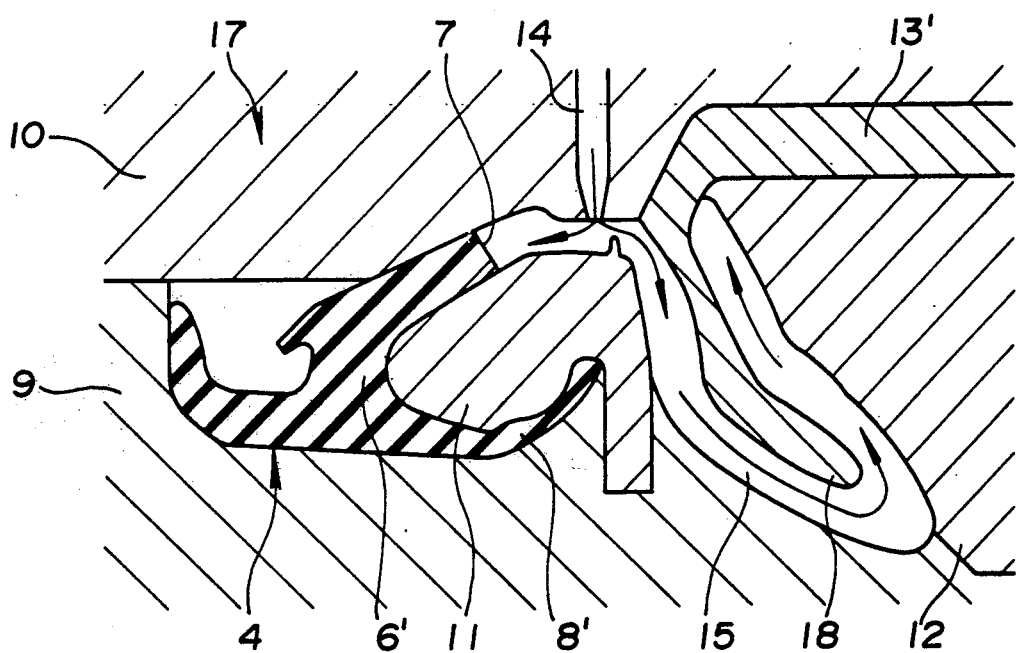
FIG. 6 is a cross sectional view of the window guide shown in FIG. 5 during assembly.

FIGS. 5 and 6 show a first preferred embodiment of a glass guide according to the present invention.

In FIG. 5, numeral 4 denotes a window run which is substantially in the form of an inserted T mounted on a door sash (not shown). The window run 4 includes side walls 6, 6' on both inner and outer sides of the vehicle body on a window run substrate 5. Terminals of the side walls 6 at the outer side of the vehicle body are formed with a small-sized window seal lip 8 and engagement lip 20. Terminals of the side wall 6' located on the inner side of the vehicular body are formed with a large-sized glass seal lip 8' and engagement lip 21. In addition, a part of the window run 4 is provided with an edge portion 7 extending along the base 5 or the window run. A window guide 102 according to the present invention is integrally formed with a resin material at the edge portion 7.

A window guide 102 is formed substantially along an outer contour of an edge of the window run 4. An extended portion A which has a dimension considerably larger than the general dimensions of the window run 4 is installed on the end edge of the window guide 102. The extended portion A is contacted with the end of the door window 3 when the door window 3 is raised, thereby permitting the door window 3 to be guided into the window run 4. In addition, a thickness reducing portion 16 is provided on the extended portion A of the window guide 102 such that the thickness of the extended portion A is the same as that of the other portions of the window guide 102, except the thickness reducing portion.

Next, a forming operation of the window guide 102 will be explained with reference to FIG. 6.

In FIG. 6, numeral 17 denotes the die assembly, including lower die 9, top die 10, middle small dies 11, 12, and 13'. Numeral 14 denotes a gate formed on the upper die 10. The middle die 13' is formed with a projection 18 on its top end in order to form the thickness reducing portion 16 on the window guide 102. Thus, the cross section of the cavity 15 within the die assembly 17 becomes uniform.

In a case where the window guide 102 is formed, a part of the edge portion 7 of the window run 4 is set in the die assembly 17 and in the state described above the molten resin is injected into the cavity 15 through the gate 14. When the molten resin is injected, the resin smoothly fills corners of the cavity 15 without occurrence of a swirl stream of molten resin, since the cross section of the passage of the cavity 15 is substantially uniform, i.e., since the extended portion A is not especially thick. Consequently, neither sink nor weld mark occurs on the outer surface of the product.

Figure 7:
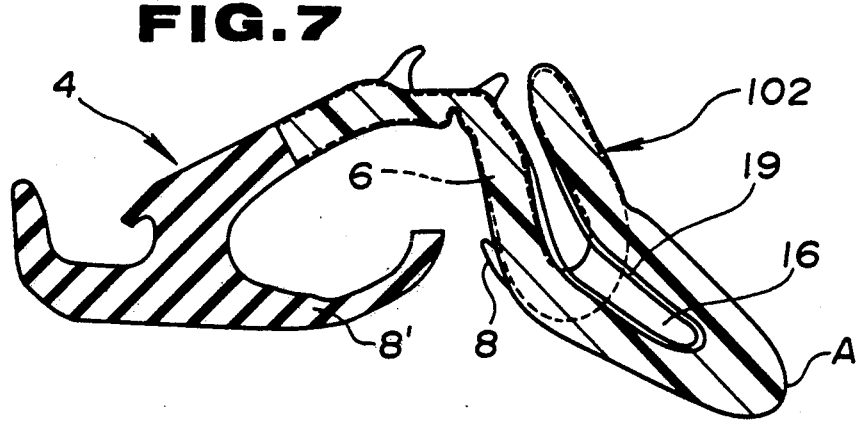
FIG. 7 is a cross sectional view of the glass guide in a second preferred embodiment according to the present invention.

FIG. 7 shows a second embodiment of the present invention. Detail similar to that of the first embodiment will be omitted here for brevity. The second embodiment is distinguished in that a predetermined number of ribs 19 are formed on a thickness reducing portion 16 of the extended portion A and, thereby, the extended portion A may be reinforced. The ribs 19 can easily be formed by forming a predetermined number of grooves along the extended direction of the middle small die 13' in FIG. 6.

It is also noted that the width of the extended portion is defined by limiting portions 22 which define a space through which molten resin may be injected for forming the extended portion.

As described hereinabove, since, in the window guide according to the present invention, a thickness reducing portion 16 is installed on the extended portion to make the thickness of the extended portion thinner with the thickness reducing portion 16 installed on the extended portion and the whole thickness becomes substantially uniform, sinks or weld marks do not appear on the extended portion A after the forming operation.

Consequently, the outer appearance quality of the product is remarkably improved.

It will fully be appreciated by those skilled in the art that the forgoing description is made in terms of the preferred embodiments and various changes and modifications may be made without departing from the scope of the present invention which is to be defined by the appended claims.

What is claimed is:

1. A structure of a window guide integrally formed with a window run applicable to an automotive vehicle, comprising:
   a) a window run member mounted on a door sash having an edge portion formed at a part of a side wall thereof facing outside of a vehicular body; and
   b) a window guide bondingly formed along the edge portion of the window run and having an extended portion extending from the contour of the window run, the extended portion having a substantially oblique U-shaped cross section having an inner surface.

2. A structure of a window guide as set forth in claim 1, which further includes seal lips formed on opposite sides of the window run and the extended portion of the window guide and a space formed between the window run and window guide so as to enable a window edge to be inserted thereinto between said seal lips.

3. A structure of a window guide as set forth in claim 2, wherein the window guide is formed of an injected molded resin material.

4. A structure of a window guide as set forth in claim 2, which further includes a predetermined number of ribs formed along the inner surface of the extended portion of the window guide.

5. A structure of a window guide integrally formed with a window run mounted on a part of a vehicular body, comprising:
   a) said window run being substantially in the form of an inverted T and having an edge formed on an end thereof and directed toward an outside of the vehicular body; and
   b) a window guide member extended from a notch toward the outside of the vehicular body and formed by injection molding, the window guide member having an extended portion being formed with a thickness reducing portion.

* * * * *